US012683752B2

(12) United States Patent     (10) Patent No.:   US 12,683,752 B2
Guo                                               (45) Date of Patent:        Jul. 14, 2026

(54) METHOD FOR RECEIVING BANDWIDTH PART COMBINATION AND METHOD FOR SENDING BANDWIDTH PART COMBINATION

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 393 days.

(21) Appl. No.: 18/551,767

(22) PCT Filed: Mar. 31, 2021

(86) PCT No.: PCT/CN2021/084721
§ 371 (c)(1),
(2) Date: Sep. 21, 2023

(87) PCT Pub. No.: WO2022/205205
PCT Pub. Date: Oct. 6, 2022

(65) Prior Publication Data
US 2024/0178980 A1      May 30, 2024

(51) Int. Cl.
*H04W 72/563*      (2023.01)
*H04L 5/00*      (2006.01)

(52) U.S. Cl.
CPC .......... *H04L 5/0094* (2013.01); *H04L 5/0053* (2013.01); *H04W 72/563* (2023.01)

(58) Field of Classification Search
None
See application file for complete search history.

(56) References Cited

U.S. PATENT DOCUMENTS

| | | | | | |
|---|---|---|---|---|---|
| 11,057,259 | B2 * | 7/2021 | Yeo | ........................ | H04L 1/0009 |
| 11,683,708 | B2 * | 6/2023 | Callender | ............ | H04W 24/10 |
| | | | | | 370/252 |

(Continued)

FOREIGN PATENT DOCUMENTS

| | | | | |
|---|---|---|---|---|
| CN | 111819810 A | 10/2020 | | |
| CN | 111954994 A | 11/2020 | | |
| EP | 3528538 B1 * | 8/2021 | .......... | H04W 36/083 |

OTHER PUBLICATIONS

R2-201071 DC location reporting for intra-band UL CA.*

(Continued)

*Primary Examiner* — Jay P Patel
(74) *Attorney, Agent, or Firm* — Oblon, McClelland, Maier & Neustadt, L.L.P.

(57)             ABSTRACT

The present disclosure relates to a method and apparatus for receiving a bandwidth part combination, and a method and apparatus for sending a bandwidth part combination. The method for receiving a bandwidth part combination can include receiving combination information of bandwidth parts (BWPs) that are sent by a base station, wherein the combination information includes at least one BWP combination, and the combination information is used for instructing a terminal to determine a direct-current subcarrier position corresponding to the at least one BWP combination, and the types of the BWP combinations in the combination information are less than the types of combinations that can be formed by all BWPs configured by the base station for the terminal.

19 Claims, 5 Drawing Sheets

(56) References Cited

U.S. PATENT DOCUMENTS

| | | | | |
|---|---|---|---|---|
| 11,811,693 | B2 * | 11/2023 | Qi | H04W 72/0453 |
| 11,985,645 | B2 * | 5/2024 | Venkata | H04L 5/0094 |
| 2020/0077432 | A1 * | 3/2020 | Xiong | H04L 5/0007 |
| 2020/0136690 | A1 * | 4/2020 | Noh | H04L 5/0094 |
| 2020/0228282 | A1 * | 7/2020 | Kwak | H04L 5/0057 |
| 2020/0359362 | A1 | 11/2020 | Yi et al. | |
| 2021/0144700 | A1 * | 5/2021 | Lee | H04L 5/001 |
| 2022/0159648 | A1 * | 5/2022 | Lee | H04W 72/21 |
| 2022/0174766 | A1 * | 6/2022 | Zhou | H04W 72/044 |
| 2022/0312416 | A1 * | 9/2022 | Venkata | H04L 5/0094 |
| 2023/0337029 | A1 * | 10/2023 | Tang | H04W 24/10 |
| 2023/0354260 | A1 * | 11/2023 | Liu | H04W 8/22 |
| 2023/0389024 | A1 * | 11/2023 | Kim | H04L 5/00 |
| 2024/0031056 | A1 * | 1/2024 | Rastegardoost | H04L 1/0007 |
| 2024/0032031 | A1 * | 1/2024 | Yi | H04W 72/1273 |
| 2024/0032055 | A1 * | 1/2024 | Xiong | H04L 5/0053 |

OTHER PUBLICATIONS

R4 2010049 LO location for intra-band UL CA.*
R4 2015212 More on DC location reporting for Intra band UL CA.*
R4 2016515 On DC Location for Intra band UL CA.*
International Search Report Issued Dec. 30, 2021, in PCT/CN2021/084721, filed on Mar. 31, 2021, 5 pages.
Nokia et al. "Signalling of UL CA DC location." 3GPP TSG-RAN WG2 Meeting #113 Electronic, R2-2100955, Feb. 5, 2021, sections 2.1 and 2.2, 17 pages.
Vivo. "Discussion on DC location Reporting," 3GPP TSG-RAN WG2 Meeting #113-e, R2-2100938, Feb. 5, 2021, sections 2 and 2.3, 6 pages.
3GPP Ts 38.331 V17.5.0 (Jun. 2023); 3rd Generation Partnership Project; Technical Specification Group Radio Access Network; NR; Radio Resource Control (RRC) protocol specification (Release 17), 1325 pages.

* cited by examiner

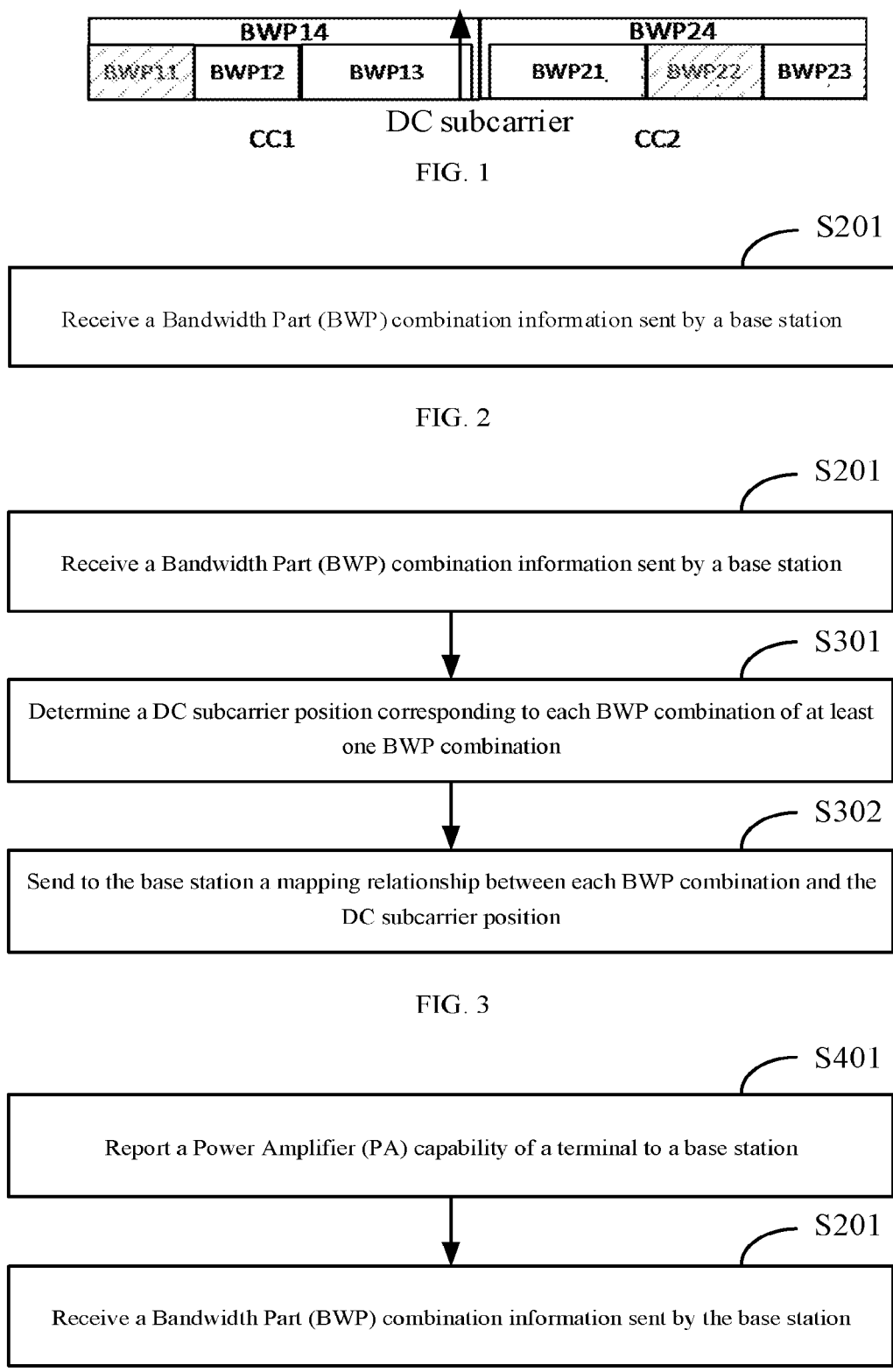

Receive a Bandwidth Part (BWP) combination information sent by a base station

Receive a Bandwidth Part (BWP) combination information sent by a base station

S301

Determine a DC subcarrier position corresponding to each BWP combination of at least one BWP combination

S302

Send to the base station a mapping relationship between each BWP combination and the DC subcarrier position

Report a Power Amplifier (PA) capability of a terminal to a base station

S201

Receive a Bandwidth Part (BWP) combination information sent by the base station

FIG. 4

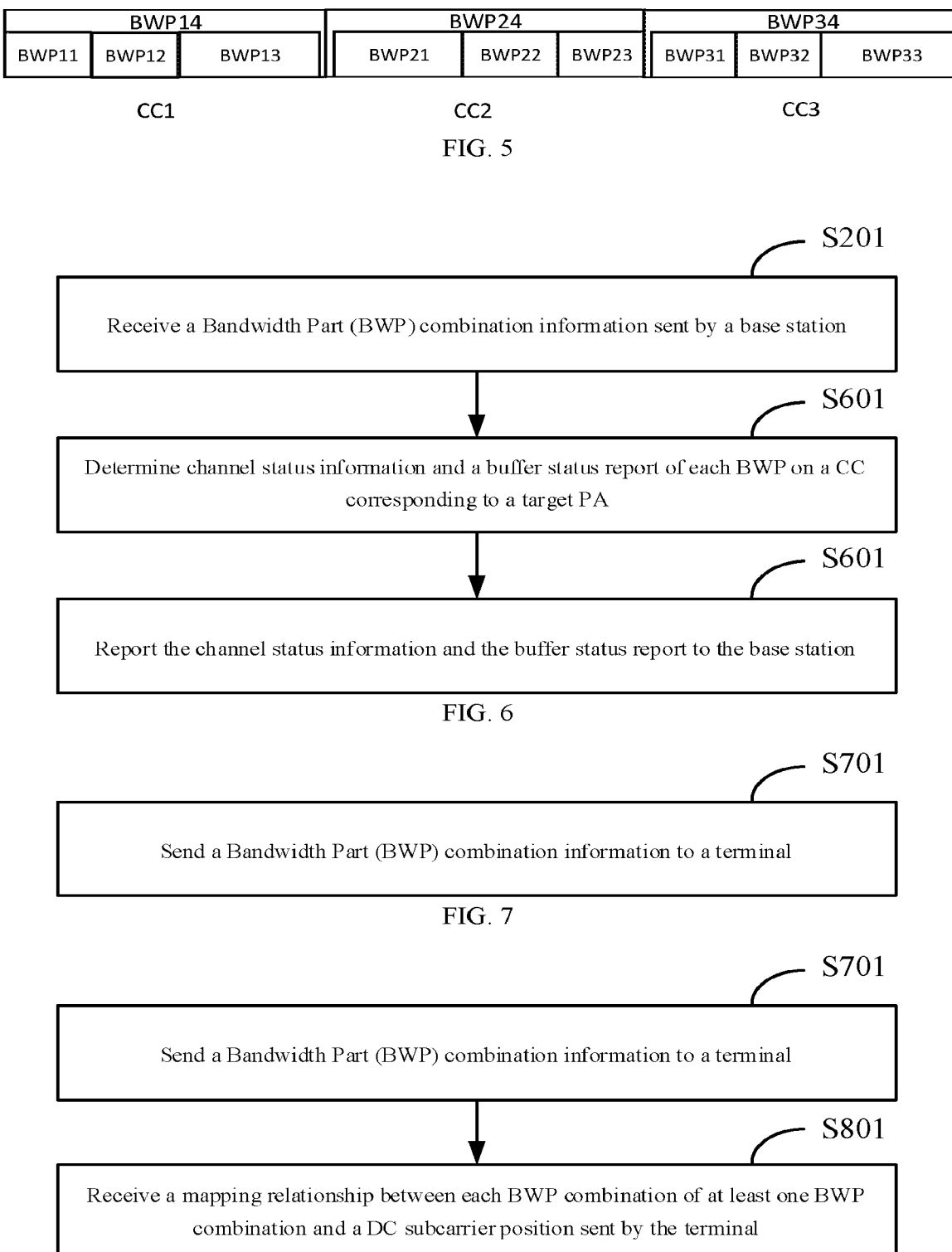

| BWP14 | | | BWP24 | | | BWP34 | | |
|---|---|---|---|---|---|---|---|---|
| BWP11 | BWP12 | BWP13 | BWP21 | BWP22 | BWP23 | BWP31 | BWP32 | BWP33 |

Receive a Bandwidth Part (BWP) combination information sent by a base station

S601

Determine channel status information and a buffer status report of each BWP on a CC corresponding to a target PA

S601

Report the channel status information and the buffer status report to the base station

Send a Bandwidth Part (BWP) combination information to a terminal

Send a Bandwidth Part (BWP) combination information to a terminal

S801

Receive a mapping relationship between each BWP combination of at least one BWP combination and a DC subcarrier position sent by the terminal

FIG. 8

METHOD FOR RECEIVING BANDWIDTH PART COMBINATION AND METHOD FOR SENDING BANDWIDTH PART COMBINATION

CROSS-REFERENCE

The present application is a U.S. National Stage of International Application No. PCT/CN2021/084721, filed on Mar. 31, 2021, the contents of which are incorporated herein by reference in their entireties for all purposes.

BACKGROUND

Technical Field

The present disclosure relates to the field of communication technologies, and in particular to a method and apparatus for receiving a bandwidth part combination, a method and apparatus for sending a bandwidth part combination, an electronic device, and a computer-readable storage medium.

Description of the Related Art

A Bandwidth Part (BWP) mechanism is introduced in communication systems such as 5G. A plurality of BWPs can be configured on one subcarrier, one of which can be activated for use by a terminal. In addition, the communication systems such as 5G can also aggregate a plurality of subcarriers together by means of carrier aggregation or dual connectivity, etc. to simultaneously use the plurality of subcarriers for information transmission. Each subcarrier in the aggregated carrier may be called a Component Carrier (CC). Generally, each CC can be configured with at least one BWP, and one of the BWPs configured for each CC can be activated. Thus, each BWP combination that may be activated in the terminal includes one BWP on each CC.

For each BWP combination that may be activated, the terminal further needs to determine related information corresponding to the BWP combination, such as a Direct Current (DC) subcarrier position.

SUMMARY

Embodiments of the present disclosure provide a method and apparatus for receiving a bandwidth part combination, and a method and apparatus for sending a bandwidth part combination.

According to a first aspect of embodiments of the present disclosure, there is provided a method for receiving a bandwidth part combination, which is applied to a terminal, and the method includes receiving a Bandwidth Part (BWP) combination information sent by a base station, wherein the combination information includes at least one BWP combination, and is configured to indicate the terminal to determine a direct current subcarrier position corresponding to the at least one BWP combination, and wherein a number of BWP combinations in the combination information is less than a number of combinations that are capable of being formed by all BWPs configured by the base station for the terminal.

According to a second aspect of embodiments of the present disclosure, there is provided a method for sending a bandwidth part combination, which is applied to a base station, and the method includes sending a Bandwidth Part (BWP) combination information to a terminal, wherein the combination information includes at least one BWP combination, and is configured to indicate the terminal to determine a direct current subcarrier position corresponding to the at least one BWP combination, and wherein a number of BWP combinations in the combination information is less than a number of combinations that are capable of being formed by all BWPs configured by the base station for the terminal.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings can be obtained from these drawings without creative labor.

FIG. 1 is a schematic diagram showing a Component Carrier (CC) according to an embodiment of the present disclosure.

FIG. 2 is a schematic flowchart showing a method for receiving a bandwidth part combination according to an embodiment of the present disclosure.

FIG. 3 is a schematic flowchart showing another method for receiving a bandwidth part combination according to an embodiment of the present disclosure.

FIG. 4 is a schematic flowchart showing another method for receiving a bandwidth part combination according to an embodiment of the present disclosure.

FIG. 5 is a schematic diagram showing another Component Carrier (CC) according to an embodiment of the present disclosure.

FIG. 6 is a schematic flowchart showing another method for receiving a bandwidth part combination according to an embodiment of the present disclosure.

FIG. 7 is a schematic flowchart showing a method for sending a bandwidth part combination according to an embodiment of the present disclosure.

FIG. 8 is a schematic flowchart showing another method for sending a bandwidth part combination according to an embodiment of the present disclosure.

DETAILED DESCRIPTION OF THE PREFERRED EMBODIMENTS

Figure 9:
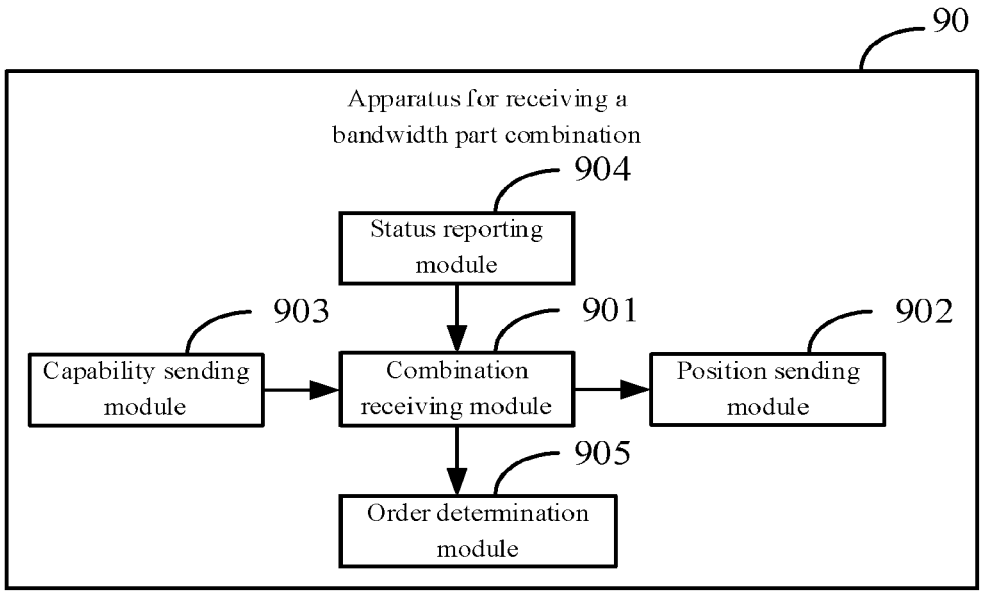
FIG. 9 is a schematic block diagram showing an apparatus for receiving a bandwidth part combination according to an embodiment of the present disclosure.

The technical solutions in embodiments of the present disclosure will be described clearly and completely with reference to the drawings in embodiments of the present disclosure below. Obviously, the described embodiments are only some of, rather than all of, the embodiments of the present disclosure. Based on the embodiments in the present disclosure, all other embodiments obtained by persons of ordinary skill in the art without making creative efforts belong to the protection scope of the present disclosure.

Reference will now be made in detail to illustrative embodiments, examples of which are illustrated in the drawings. The following description refers to the drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with some aspects related to embodiments of the present disclosure as recited in the appended claims.

The terms used in embodiments of the present disclosure are merely for the purpose of describing particular embodiments and are not intended to limit embodiments of the present disclosure. As used in embodiments of the present disclosure and the appended claims, the singular forms "a" and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of embodiments of the present disclosure, first information may also be referred to as second information, and similarly, the second information may also be referred to as the first information. Depending on the context, the word "if" as used herein can be interpreted as "upon" or "when" or "in response to determination".

Embodiments of the present disclosure are described in detail below, examples of which are illustrated in the drawings, where like or similar reference numerals designate like or similar elements throughout. Embodiments described below with reference to the drawings are illustrative and are intended to explain the present disclosure and should not be construed as limiting the present disclosure.

The development of mobile communication technologies and chip processing capabilities provides hardware support for Fast Fourier Transform (FFT) and Orthogonal Frequency Division Multiplexing (OFDM) technologies, and has also become an important foundation for communication technologies such as 4G and 5G. The OFDM is a technology based on orthogonal subcarriers. When a terminal or a base station transmits a signal, due to a phase noise of a local oscillator, a larger noise will be generated at a carrier frequency, which can be called carrier leakage. As a result, a signal on a subcarrier where the local oscillator is located will be distorted. The subcarrier where the local oscillator is located may be generally called a DC subcarrier.

In communication systems, in order to avoid the influence of the carrier leakage and improve a demodulation performance of the base station, the base station needs to know the DC subcarrier position of the terminal for compensation processing, etc.

In a 4G system, system bandwidths of the terminal and the base station are consistent, so the base station can directly determine the DC subcarrier position of the terminal according to the system bandwidth.

In a communication system such as 5G, a plurality of BWPs can be configured in a single carrier, so that the bandwidth of the terminal is no longer fixed, but is determined by the activated BWP. Therefore, the DC subcarrier position in the terminal is also related to the activated BWP, that is, it varies with the activated BWP.

In the related arts, after determining the activated BWP, the terminal may send the DC subcarrier position to the base station. However, the BWP activation state in the terminal changes more frequently. If the terminal re-sends the DC subcarrier position to the base station every time the BWP activation state is changed, it will not only waste communication resources, but also increase the performance pressure of the terminal and the base station.

In order to avoid the above problems in the related arts, the terminal may send all possible DC subcarrier positions corresponding to the activated BWP to the base station in advance, for example, the terminal may send a mapping relationship between each BWP and a DC subcarrier position to indicate the DC subcarrier position in a case that the BWP is activated. For example, the terminal can send it through the txDirectCurrentPosition message. In this method, after determining the BWP activated by the terminal, the base station can directly query the mapping relationship to determine the DC subcarrier position in the terminal, without the need to obtain the DC subcarrier position from the terminal separately, which not only saves communication resources, but also alleviates the performance pressure of the terminal and the base station.

One or more local oscillators and Power Amplifiers (PAs) may be configured in the terminal, and the local oscillators and the PAs are typically in one-to-one correspondence, and each local oscillator corresponds to one DC subcarrier. Generally, for each local oscillator, the terminal may send the DC subcarrier position corresponding to the local oscillator through the above method.

In the communication system such as 5G, the terminal can configure Carrier Aggregation (CA), Dual-Connectivity (DC), etc., to aggregate a plurality of subcarriers together to simultaneously use the plurality of subcarriers for information transmission. The aggregated subcarrier may be referred to as a Component Carrier (CC).

In a case that the terminal is configured with the plurality of CCs, the terminal may determine a corresponding PA for each CC. Here, the PA corresponding to the CC refers to sending the CC corresponding to the PA through the PA. If the number of CCs is not greater than the number of PAs, each PA corresponds to at most one CC. For each PA, the terminal can determine a mapping relationship between each BWP on the CC corresponding to the PA and the DC subcarrier position. If the number of CCs is greater than the number of PAS, there is a PA corresponding to several CCs. For the convenience of description, the PA corresponding to the several CCs is called a target PA here, and a DC subcarrier position corresponding to the target PA is related to the activated BWP combination in the several CCs corresponding to the target PA.

In this case, for each target PA, the terminal may: determine the number of BWP combinations that can be formed by all BWPs configured in all CCs on the target PA. According to the related arts for the BWP, an activated BWP can be determined from at least one BWP on each CC, that is, each CC activates one BWP. Based on this, each BWP combination in embodiments of the present disclosure may include BWPs that respectively belong to different CCs on the target PA. Taking the CCs corresponding to one target PA shown in FIG. 1 as an example, the target PA corresponds to CC1 and CC2, where CC1 is configured with four BWPs, which are respectively BWP11, BWP12, BWP13, and BWP14; CC2 is also configured with four BWPs, which are respectively BWP21, BWP22, BWP23, and BWP24. The BWP combinations that can be formed by the target PA are composed of one BWP belonging to CC1 and one BWP belonging to CC2, that is, sixteen BWP combinations can be formed.

However, one target PA may correspond to a plurality of CCs, and each CC may also be configured with a plurality of BWPs. As a result, there are numerous BWP combinations that can be formed by all BWPs configured in all CCs on the target PA. As shown in FIG. 1, the BWPs configured on the CCs corresponding to the target PA can form sixteen different BWP combinations. As the number of CCs increases, the number of BWP combinations formed will also increase sharply. If the terminal sends the DC subcarrier positions corresponding to all combinations that can be formed to the base station, the amount of information that needs to be transmitted is relatively large, which wastes the signaling overhead and puts a large performance pressure on the terminal and the base station.

In view of this, embodiments of the present disclosure provide a method for sending a BWP combination and a method for receiving a BWP combination to solve the above technical problems.

FIG. 2 is a schematic flowchart showing a method for receiving a bandwidth part combination according to an embodiment of the present disclosure. The method for receiving the bandwidth part combination shown in this embodiment may be applied to a terminal, and the terminal includes but is not limited to an electronic device such as a mobile phone, a tablet computer, a wearable device, a sensor, and an Internet of Things device. The terminal may serve as a user equipment to communicate with a base station, and the base station includes but is not limited to a 4G base station, a 5G base station, and a 6G base station. In an embodiment, the base station may be a base station to which the method for sending the bandwidth part combination described in any subsequent embodiment is applicable.

As shown in FIG. 2, the method for receiving the bandwidth part combination may include the following step S201.

In the step S201, a Bandwidth Part (BWP) combination information sent by a base station is received.

The combination information includes at least one BWP combination, and is configured to indicate the terminal to determine a DC subcarrier position corresponding to the at least one BWP combination, and the number of BWP combinations in the combination information is less than the number of combinations that can be formed by all BWPs configured by the base station for the terminal.

In an embodiment, the base station may select the at least one BWP combination according to a preset method, and then the base station may form the BWP combination information from the at least one BWP combination and send it to the terminal. Compared with the number of combinations that can be formed by all the BWPs configured for the terminal, the number of BWP combinations determined by the base station according to the preset method is less.

In an embodiment, the terminal may determine a DC subcarrier corresponding to the BWP combination. The BWP combination may be all or some of the BWP combinations in the BWP combination information, or the terminal may also determine one or more BWP combinations by itself, as long as the number of BWP combinations is less than the number of combinations that can be formed by all BWPs configured by the base station for the terminal, which is not specifically limited in embodiments of the present disclosure.

According to the above embodiments, the terminal can receive the BWP combination information sent by the base station, so that the terminal can determine the DC subcarrier corresponding to the BWP combination based on the BWP combination information, instead of enumerating DC subcarrier positions of the BWP combinations that can be formed by all BWPs, thereby reducing the performance pressure of the terminal. Further, if the terminal needs to send the DC subcarrier position to the base station, the terminal can send less data to the base station, which can save the signaling overhead.

FIG. 3 is a schematic flowchart showing another method for receiving a bandwidth part combination according to an embodiment of the present disclosure. As shown in FIG. 3, the method may further include steps 301 to 302.

In the step S301, a DC subcarrier position corresponding to each BWP combination of the at least one BWP combination is determined.

In an embodiment, after receiving the BWP combination information, the terminal determines, for each BWP combination in the combination information, the DC subcarrier position of the terminal in a case that an activated BWP is a BWP in the BWP combination.

Taking FIG. 1 as an example, for the BWP combination of BWP11 and BWP22, the terminal can determine that in the case that the BWP11 is activated in the CC1 and the BWP22 is activated in the CC2, the DC subcarrier position of the terminal is as shown in FIG. 1.

It should be noted that this is only an example of a BWP combination shown in FIG. 1. If the BWP combination includes other BWPs (for example, the BWP combination includes BWP12 and BWP22), the terminal may also determine the DC subcarrier position in the terminal in the case that the activated BWP is the BWP in the BWP combination.

In an embodiment, the DC subcarrier position may be expressed as a specific frequency, or may also be identified as an offset of the DC subcarrier position relative to a preset reference frequency, or may also be expressed in other ways, which is not limited in embodiments of the present disclosure.

In the step S302, a mapping relationship between each BWP combination and the DC subcarrier position is sent to the base station.

In an embodiment, after determining the DC subcarrier position corresponding to each BWP combination in the BWP combination information, the terminal may send to the base station the mapping relationship between each BWP combination and the DC subcarrier position.

In an example, the terminal may send an identity of the BWP combination and the corresponding DC subcarrier position. For example, the terminal can send a table, where each entry includes a BWP combination and a DC subcarrier position corresponding to the BWP combination. Alternatively, the terminal can send a key-value pair, and each key-value pair includes a BWP combination and a DC subcarrier position corresponding to the BWP combination, and so on. The table and the key-value pair here are only illustrative descriptions, and in practical applications, the terminal may also use other forms to reflect the mapping relationship between the BWP combination and the DC subcarrier position.

In an example, the terminal may also determine an arrangement order of the DC subcarrier positions according to a specified order, so as to determine the BWP combination corresponding to the DC subcarrier position by means of the order. For example, the terminal can determine the arrangement order of the DC subcarrier positions according to an arrangement order of respective BWPs in the BWP combination information. Alternatively, the BWP combination information may further include a priority of each BWP, and the terminal can determine the arrangement order of the DC subcarrier positions according to a priority order. For example, the order of priorities from high to low is used as the arrangement order of the DC subcarrier positions.

In an example, a default relative position may be set in advance for the DC subcarrier in the terminal. For example, the default relative position may be a frequency center point of the highest frequency and the lowest frequency among the frequency bands occupied by respective BWPs in the BWP combination, or may also have a specified offset relative to the center point, for example, the offset relative to the center point is 7.5 kHz, and so on.

In an example, in response to the DC subcarrier position corresponding to the BWP combination being inconsistent with the default relative position, the terminal sends to the base station description information of the DC subcarrier position corresponding to the BWP combination. Alternatively, in response to the DC subcarrier position corresponding to the BWP combination being consistent with the default relative position, the terminal sends preset information to the base station.

The description information may be used for the base station to determine the DC subcarrier position, which, for example, may be a frequency of the DC subcarrier, or an offset of the DC subcarrier position relative to the preset reference frequency, or an offset of the DC subcarrier position relative to the frequency center point, etc.

When the DC subcarrier position is consistent with the default relative position, in order to reduce the data volume, the terminal may no longer send a specific DC subcarrier position, but directly sends preset information, indicating to the base station that the DC subcarrier position is the predetermined default relative position. The default relative position may be stipulated by a protocol, or may be determined through pre-negotiation between the terminal and the base station, etc., which is not limited in embodiments of the present disclosure. Generally speaking, the data volume of the preset information is less than that of the description information of the DC subcarrier position, for example, the preset information may only occupy one bit. Therefore, according to the method of embodiments of the present disclosure, the amount of information sent by the terminal to the base station can be further reduced, reducing the signaling overhead.

It should be noted that the above-mentioned method for the terminal to send the mapping relationship is only illustrative description, and other methods may also be adopted in practical applications, which are not limited in embodiments of the present disclosure.

In an embodiment, the base station receives the mapping relationship between each BWP combination of the at least one BWP combination and the DC subcarrier position sent by the terminal.

According to the mapping relationship, the base station can determine a DC subcarrier position corresponding to a BWP combination currently activated by the terminal. Therefore, after determining the activated BWP combination for the terminal, the base station does not need to query the terminal for the DC subcarrier position corresponding to this BWP combination, but directly determines the DC subcarrier position according to the pre-received mapping relationship, reducing the signaling overhead, and avoiding the latency caused by signaling interaction.

In an embodiment, the base station can send the BWP combination information to all terminals.

In an embodiment, the base station may not send the BWP combination information to all terminals, but determines whether there is a need to send the BWP combination information to the terminal according to a PA capability of the terminal, which will be described below with reference to FIG. 4.

FIG. 4 is a schematic flowchart showing another method for receiving a bandwidth part combination according to an embodiment of the present disclosure. As shown in FIG. 4, the method may further include:

in step S401, a Power Amplifier (PA) capability of the terminal is reported to the base station, and the PA capability is used for the base station to determine to send the combination information to the terminal, and to determine the combination information.

In an embodiment, the base station may receive the PA capability reported by the terminal, and determine, based on the PA capability, to send the combination information to the terminal, and determine, based on the PA capability, the combination information.

In an embodiment, the PA capability reported by the terminal may include the number of PAs of the terminal. It should be noted that since there is a one-to-one correspondence in the terminal between the local oscillators and the PAs, the number of PAs is also the number of local oscillators. For the convenience of description, no distinction will be made below.

In an embodiment, if the number of PAs is less than the number of CCs configured for the terminal, at least one PA configured for the terminal includes at least one target PA corresponding to a plurality of CCs. For a PA corresponding to one CC, since one CC is configured with a maximum of four BWPs, in order to simplify the solution, the base station may not send the BWP combination information to the terminal, but the base station directly sends correspondences between all BWPs and DC subcarrier positions, without leading to the excessive signaling overhead.

For the target PA corresponding to the plurality of CCs, the number of BWP combinations that can be formed by BWPs in the plurality of CCs corresponding to the PA is relatively large, and if the correspondences between all BWPs and DC subcarrier positions are sent, the excessive signaling overhead will be caused. In view of this, in an embodiment, the base station may determine the number of PAs in the terminal according to the PA capability, and determine to send the combination information to the terminal in response to the number of PAs being less than the number of CCs configured for the terminal.

In an embodiment, in response to the number of PAs being not less than the number of CCs configured for the terminal, the base station may determine not to send the combination information to the terminal. In this way, the base station can reduce the information that is required to be sent, saving the communication resources.

In an embodiment, in a case that the base station determines that it needs to send the BWP combination information to the terminal, the base station may determine the number of BWP combinations required to be included in the combination information according to its own load. For case of distinction, the number of BWP combinations in the BWP combination information may be denoted as a first number.

For example, the base station may determine that the first number is negatively correlated with the load of the base station. The higher the load of the base station, the fewer the number of BWP combinations included in the BWP combination information; and the lower the load of the base station, the more the number of BWP combinations included in the BWP combination information. A specific method for the base station to determine the first number may depend on the actual conditions, which is not limited in embodiments of the present disclosure.

In an embodiment, in the case that the base station determines that it needs to send the BWP combination information to the terminal, the base station may determine the combination information according to the PA capability, that is, determine a specific number of BWP combinations in the combination information.

In an example, the PA capability may include the maximum channel bandwidth supported by the PA.

Based on this, in an embodiment, the base station can determine the maximum channel bandwidth supported by each PA in the terminal according to the PA capability, and the base station can also determine the CC corresponding to each PA according to bandwidths of the plurality of CCs configured for the terminal. For example, the terminal includes two PAs, and the terminal is configured with three CCs, the maximum bandwidth supported by one of the PAs can only cover one of the CCs, while the maximum bandwidth supported by the other PA can cover the other two CCs, and the base station can determine the correspondence between the PA and the CC accordingly.

In an embodiment, if the number of PAs configured for the terminal and the number of CCs configured for the terminal are relatively large, for example, more than 2, it is relatively difficult for the base station to determine the correspondence between the PA and the CC according to the maximum bandwidth supported by the PA and the bandwidth of each CC. In order to avoid an error, the terminal may report to the base station the CC corresponding to each PA in the terminal, for example, the terminal may send the correspondence between the PA and the CC. Thereby, the base station can determine the CC corresponding to each PA.

In an embodiment, if the number of PAs in the terminal is less than the number of CCs configured for the terminal, it may be determined that the PAs configured in the terminal include at least one target PA, and the target PA corresponds to a plurality of CCs. Among the plurality of CCs corresponding to the target PA, each CC corresponds to at least one BWP.

In an embodiment, the BWP combination information sent by the base station to the terminal may be BWP combination information corresponding to the target PA, and individual BWPs in each BWP combination in the BWP combination information belong to different CCs in the target PA. In an embodiment, the number of BWP combinations in the combination information is less than the number of all combinations that can be formed by BWPs on the plurality of CCs corresponding to the target PA.

Taking FIG. 1 as an example, if the target PA corresponds to CC1 and CC2, and CC1 and CC2 are respectively configured with four BWPs. For the target PA, among the BWP combinations that can be formed by the BWPs on the two CCs corresponding to the target PA, the BWPs in each BWP combination belong to different CCs, and there are 16 BWP combinations that can be formed, which are respectively: BWP11 and BWP21; BWP11 and BWP22; BWP11 and BWP23; BWP11 and BWP24; BWP12 and BWP21; BWP12 and BWP22; BWP12 and BWP23; BWP12 and BWP24; BWP13 and BWP21; BWP13 and BWP22; BWP13 and BWP23; BWP13 and BWP24; BWP14 and BWP21; BWP14 and BWP22; BWP14 and BWP23; BWP14 and BWP24. According to the method described in embodiments of the present disclosure, the base station may send to the terminal some of the above sixteen BWP combinations that can be formed, for example, the base station can send to the terminal five, ten, etc., of the sixteen BWP combinations, as long as the number is less than sixteen, which is not limited by embodiments of the present disclosure.

In an embodiment, the terminal can receive the BWP combination information sent by the base station, for example, the five BWP combinations, the ten BWP combinations, etc. sent by the base station in the above example, determine the DC subcarrier corresponding to each BWP combination, and send to the base station the mapping relationship between each BWP combination and the DC subcarrier position. Compared with the related arts in which the terminal sends to the base station the DC subcarrier positions corresponding to all BWP combinations (such as the above sixteen BWP combinations) that can be formed by the BWPs on the plurality of CCs corresponding to the target PA, the method in embodiments of the present disclosure greatly reduces the data volume of the information sent by the terminal to the base station, which can not only save the signaling overhead, but also reduce the power consumption of the terminal and the base station.

In an embodiment, when determining the BWP combination information, the base station may determine the BWP combination according to the BWPs on all CCs corresponding to the target PA. For example, the BWP combination may be determined as that the BWPs in each BWP combination are in a one-to-one correspondence with the plurality of CCs corresponding to the target PA.

As shown in FIG. 5, the target PA corresponding to three CCs (i.e., CC1, CC2, and CC3 in FIG. 5) is taken as an example, where CC1 includes four BWPs (i.e., BWP11, BWP12, BWP13, and BWP14 in FIG. 5), CC2 includes four BWPs (i.e., BWP21, BWP22, BWP23, and BWP24 in FIG. 5), and CC3 also includes four BWPs (i.e., BWP31, BWP32, BWP33, and BWP34 in FIG. 5).

When determining the BWP combination information, the base station may respectively select one BWP from the four BWPs on CC1, select one BWP from the four BWPs on CC2, and select one BWP from the four BWPs on CC3 to obtain three BWPs as one BWP combination. By means of the same method, the base station can perform the above selection process multiple times as needed, and continue to obtain other different BWP combinations. In this way, the BWPs in the BWP combination are in a one-to-one correspondence with the three CCs corresponding to the target PA.

In an embodiment, when determining the BWP combination information, the base station may also determine the BWP combination according to the BWPs on some of the plurality of CCs corresponding to the target PA. For example, the BWP combination may be determined as that BWPs in each BWP combination are in a one-to-one correspondence with some of the plurality of CCs corresponding to the target PA. For example, if the target PA corresponds to three CCs, the BWP combination may be determined according to the BWPs on two of the three CCs.

In an example, the base station may determine the BWP combination according to the BWPs on a CC belonging to the highest frequency band and a CC belonging to the lowest frequency band among the plurality of CCs corresponding to the target PA. For example, the BWP combination may be determined as that BWPs in each BWP combination correspond to the CC belonging to the highest frequency band and the CC belonging to the lowest frequency band among the plurality of CCs corresponding to the target PA.

Still taking FIG. 5 as an example, among CC1, CC2, and CC3 corresponding to the target PA, the CC belonging to the highest frequency band is CC3, and the CC belonging to the lowest frequency band is CC1. Therefore, when determining the BWP combination information, the base station can respectively select one BWP from the four BWPs on CC1 and select one BWP from the four BWPs on CC3 to obtain two BWPs as the BWP combination. By means of the same method, the base station can perform the above selection process multiple times as needed, and continue to obtain other different BWP combinations. In this way, the BWPs in the BWP combination correspond to the CC1 and CC3 corresponding to the target PA.

It should be noted that the DC subcarrier position in the terminal is related to the activated BWP combination, and more commonly, the DC subcarrier position is related to the BWP belonging to the lowest frequency band and the BWP belonging to the highest frequency band. According to the method in embodiments of the present disclosure, when the target PA corresponds to more than two CCs, the BWP combination can be determined according to the BWPs on the CC belonging to the highest frequency band and the CC belonging to the lowest frequency band, instead of determining the BWP combination according to the BWPs on all CCs, which can not only reduce the number of BWP combinations, but also reduce the amount of information in each BWP combination, thereby saving the signaling overhead and reducing the power consumption of the terminal and the base station.

In an embodiment, the terminal may send assistance information to the base station to assist the base station in determining the BWP combination information. For example, the assistance information may include at least one of channel status information and a buffer status report of the BWP, which is illustrated with reference to FIG. 6 below.

FIG. 6 is a schematic flowchart showing another method for receiving a bandwidth part combination according to an embodiment of the present disclosure. As shown in FIG. 6, the method may further include steps 601 to 602.

In the step S601, channel status information and a buffer status report of each BWP on the CC corresponding to the target PA are determined.

In an embodiment, the terminal can determine a BWP status required by the base station. For example, if the base station determines the BWP combination according to the BWPs on all CCs corresponding to the target PA, the terminal may send to the base station a status of each BWP on all CCs corresponding to the target PA. Alternatively, if the base station determines the BWP combination according to the BWPs on some of the plurality of CCs corresponding to the target PA, the terminal may send to the base station a status of each BWP on some of the CCs required by the base station. For example, the terminal may send to the base station a status of each BWP on the CC belonging to the highest frequency band and the CC belonging to the lowest frequency band among the plurality of CCs corresponding to the target PA.

In an embodiment, the status of the BWP may include at least one of the channel status information and the buffer status report of the BWP.

The channel status information may include at least one of a Reference Signal Received Power (RSRP), a Signal-to-Noise Ratio (SNR/SINR), a channel latency, etc., and is used to indicate a channel status of the BWP. Generally speaking, the greater the channel power, the better the channel status of the BWP; the greater the signal-to-noise ratio, the better the channel status of the BWP; and the smaller the channel latency, the better the channel status of the BWP. The better the channel status of the BWP, the higher the probability of the BWP being activated. Note that, the channel status information may further include other information indicating the channel status of the BWP, and this embodiment is only an illustrative description rather than a limitation.

The buffer status report may include the data volume to be sent in the terminal, that is, the buffered data volume. Generally speaking, the smaller the buffered data volume, the more idle the channel of the BWP, and the higher the probability of the BWP being activated.

In the step S602, the channel status information and the buffer status report are reported to the base station. The channel status information and the buffer status report are used for the base station to determine the combination information.

In an embodiment, the terminal may send at least one of the channel status information and the buffer status report to the base station.

In an embodiment, the base station may determine, based on at least one of the channel status information and the buffer status report, at least one of the channel status and the buffered data volume of each BWP on the CC corresponding to the target PA; and determine the combination information according to the at least one of the channel status and the buffered data volume.

In an embodiment, the base station may receive information reported by a plurality of terminals, and comprehensively consider the information to determine the channel status of each BWP. For example, the base station may determine the status of the BWP according to a sum of buffered data volumes of all terminals. For a specific implementation, the base station can perform the determination according to actual situations, which is not limited in embodiments of the present disclosure.

In an embodiment, the base station may determine a channel status threshold and a buffered data volume threshold based on the channel status and the buffered data volume of each BWP on the CC corresponding to the target PA. The channel status of each BWP in each BWP combination in the combination information is better than the channel status threshold, and the buffered data volume is less than the buffered data volume threshold.

In an example, the channel status threshold and the buffered data volume threshold may be preset specific values, for example, at least one of a channel power threshold N1, a signal-to-noise ratio threshold N2, a channel latency threshold N3, and a buffered data volume threshold N4 may be preset. Based on this, the base station can screen out all BWPs whose channel status is better than the threshold and whose buffered data volume is less than the threshold according to the channel status and the buffered data volume of each BWP, and then determine the BWP combination based on the screened BWPs.

In an example, the channel status threshold and the buffered data volume threshold may also be preset ratios, which, for example, may be 50%. Thereby, the base station can screen out BWPs whose channel status and buffered data volume are the top 50% of all BWPs. Alternatively, the base station may also screen out BWPs whose channel status or buffered data volume is the top 50% of all BWPs, and then determine the BWP combination based on the screened BWP. The top 50% of the channel status refers to the BWP whose channel status is better than the other 50%, and the top 50% of the buffered data volume refers to the BWP whose buffered data volume is less than the other 50%.

In an example, for the CC corresponding to the target PA, the base station may also determine a priority of each BWP among respective BWPs on the CC based on the channel status and the buffered data volume of each BWP on the CC; and then determine at least one BWP combination based on the priority of each BWP among the respective BWPs on the CC to which each BWP belongs and in an order of priority from high to low.

The priority is positively correlated with the channel status, and the priority is negatively correlated with the buffered data volume. A combination priority of each BWP combination in the combination information is positively correlated with the priority of each BWP in the combination, and the combination priority of each BWP combination in the combination information is higher than a priority threshold.

It should be noted that in embodiments of the present disclosure, the priority level of the BWP can be regarded as the probability of the BWP being activated. The better the channel status of the BWP and the less the buffered data volume of the BWP, the higher the probability of the BWP being activated. Then it can be determined that the BWP has a higher priority.

For example, for the CC corresponding to the target PA, for example, all CCs corresponding to the target PA, or some of CCs corresponding to the target PA, the base station may determine a priority order of respective BWPs in the CC.

For example, for CC1-CC3 in FIG. 5, a priority order of respective BWPs in each CC may be determined. For example, for the four BWPs on CC1, the priority order from high to low can be BWP11, BWP12, BWP13, BWP14; for the four BWPs on CC2, the priority order from high to low can be BWP21, BWP22, BWP23, BWP24; and for the four BWPs on CC3, the priority order from high to low can be BWP31, BWP32, BWP33, BWP34.

After determining the priority of each BWP, the base station can determine the BWP combination according to the priority of each BWP to form the BWP combination information. In the BWP combination information, each BWP combination corresponds to a combination priority, and an order of the BWP combination priority may be determined according to the priority of each BWP in the BWP combination.

For example, the base station may determine the combination priority of the BWP combination according to the sum, in an ascending order, of the priority orders of respective BWPs in the BWP combination. For example, the BWPs with the highest priority in the CCs may form the BWP combination with the highest combination priority; and then, the BWP combinations with a descending combination priority order can be determined according to an order in which the priority of each BWP descends. For example, for CC1-CC3 in FIG. 5, the BWP combination with the highest combination priority can be BWP11, BWP21, BWP31, and the sum of the priority orders of respective BWPs in this BWP combination is 3; then it can be determined that a BWP combination with the second combination priority is a BWP combination in which the sum of the priority orders of respective BWPs is 4, such as one of the following three combinations: BWP12, BWP21, BWP31; BWP11, BWP22, BWP31; BWP11, BWP21, BWP32. Note that, the base station can determine a priority order of the above three combinations according to the actual situation. For example, the base station may directly determine the priority order according to sequence numbers, or the base station may randomly determine the priority order, or the base station may determine the priority order according to the sum of the BWP buffered data volume, etc., which is not limited by embodiments of the present disclosure. By means of the same method, the base station can continue to determine the BWP combination with a lower combination priority, which will not be repeated here.

In an example, the base station may determine the BWP combination information according to the combination priority of the BWP combination. For example, the base station may preset a priority threshold, and then form the BWP combination information by the BWP combinations whose combination priority is higher than the preset threshold. For example, the base station may preset the priority threshold as a ratio (for example, 50%), and then form the BWP combination information from the BWP combinations whose combination priority is in the top 50%.

Alternatively, the base station may also determine the number of BWP combinations contained in the combination information. In an example, the number may be the first number determined by the base station according to the load. Thereby, the base station may determine that the combination information includes the first number of BWP combinations, and the combination priority of the first number of BWP combinations is higher than that of other BWP combinations.

According to the above-mentioned embodiments, the base station can determine the BWP combination information according to the BWP status, so that each BWP combination in the BWP combination information has a higher probability of being activated than other BWP combinations, and then a probability that the base station needs to query its corresponding DC subcarrier position is also higher. For the BWP combination with a lower probability of being activated, the probability that the base station queries its corresponding DC subcarrier position is also lower. Therefore, the base station may not obtain the DC subcarrier position with a low query probability, which reduces the signaling overhead and the performance pressure without affecting the basic function. In addition, the base station needs to save fewer mapping relationships, which not only reduces the storage pressure, but also accelerates the speed of subsequently querying the DC subcarrier position according to the activated BWP combination.

In an embodiment, after determining the priority of the BWP combination, the base station may send to the terminal the priority of each BWP combination in the combination information for the terminal to determine a sending order of the DC subcarrier positions based on the priority.

In an embodiment, the terminal may receive priority information of the at least one BWP combination sent by the base station, and determine the sending order of the DC subcarrier positions according to the priority information. Thereby, when sending the mapping relationship between each BWP combination and the DC subcarrier position to the base station, the terminal may send the mapping relationship to the base station according to the sending order.

In an example, when sending the BWP combination information to the terminal, the base station can send the BWP combination and a priority identifier corresponding to the BWP combination; or the base station may determine an arrangement order of the BWP combinations in the BWP combination information according to the priority order. For example, an order of respective BWP combinations in the BWP combination information is determined according to the priority from high to low or from low to high. Thereby, the terminal can determine the priority of the BWP combination according to the order.

In an example, the terminal may send the DC subcarrier positions according to the priority order of respective BWP combinations from high to low, for example, the terminal may send the identity of the BWP combination and the corresponding DC subcarrier position, or may also directly send the DC subcarrier position, etc. For details, reference may be made to the method in the embodiment shown in FIG. 3, which will not be repeated here.

In an embodiment, when receiving the DC subcarrier position sent by the terminal, the base station may receive a part of the DC subcarrier positions according to an order, rather than receiving all DC subcarrier positions.

It should be noted that when the terminal sends the DC subcarrier position, it sends it according to the combination priority of the BWP combination corresponding to the DC subcarrier position, so the base station receives the DC subcarrier position corresponding to the BWP combination with a higher combination priority according to the order of combination priorities from high to low. For the BWP combination with the higher combination priority, a probability that the terminal activates each BWP in the BWP combination is higher, so the probability that the base station needs to query its corresponding DC subcarrier position is also higher. While for the BWP combination with the lower combination priority, a probability that the terminal activates each BWP in the BWP combination is lower, so the probability that the base station needs to query its corresponding DC subcarrier position is also lower. For the DC subcarrier position with a lower use probability, the base station may not perform reception, which reduces the performance pressure, and also speeds up the speed of querying the DC subcarrier position.

In an example, the base station may determine a second number of BWP combinations that need to be received according to the load of the base station; and then receive the second number of DC subcarrier positions.

The second number is negatively correlated with the load of the base station. That is to say, the higher the load of the base station, the fewer the number of DC subcarrier positions received by the base station, and the lower the load of the base station, the more the number of DC subcarrier positions received by the base station.

In an example, the second number may also be the same as the number of BWP combinations in the combination information, that is, all the DC subcarrier positions are received. For example, the second number may also be the first number in the foregoing embodiments, which is not limited in embodiments of the present disclosure.

FIG. 7 is a schematic flowchart showing a method for sending a bandwidth part combination according to an embodiment of the present disclosure. The method for sending the bandwidth part combination shown in this embodiment may be applied to a base station, and the base station includes but is not limited to a 4G base stations, a 5G base stations, and a 6G base station. The base station may communicate with a terminal serving as a user equipment, and the terminal includes but is not limited to an electronic device such as a mobile phone, a tablet computer, a wearable device, a sensor, and an Internet of Things device. In an embodiment, the terminal may be a terminal to which the method for receiving the bandwidth part combination in any of the foregoing embodiments is applicable.

As shown in FIG. 7, the method for sending the bandwidth part combination may include the following step:

in step S701, Bandwidth Part (BWP) combination information is sent to a terminal.

The combination information includes at least one BWP combination, and is configured to indicate the terminal to determine a DC subcarrier position corresponding to the at least one BWP combination, and the number of BWP combinations in the combination information is less than the number of combinations that can be formed by all BWPs configured by the base station for the terminal.

In an embodiment, the base station may determine the at least one BWP combination according to a preset method, and then the base station may form the BWP combination information from the at least one BWP combination and send it to the terminal. Compared with the number of combinations that can be formed by all the BWPs configured for the terminal, the number of BWP combinations determined by the base station according to the preset method is less.

According to the above embodiments, the terminal may receive the BWP combination information sent by the base station, so that the terminal may send the DC subcarrier position to the base station based on the BWP combination information, instead of sending the DC subcarrier positions of the BWP combinations that can be formed by all configured BWPs to the base station. That is, the terminal may send less data to the base station, which may save the signaling overhead on the one hand, and reduce the performance pressure on the other hand.

FIG. 8 is a schematic flowchart showing another method for sending a bandwidth part combination according to an embodiment of the present disclosure. As shown in FIG. 8, the method further includes, in step S801, a mapping relationship sent by the terminal between each BWP combination of the at least one BWP combination and a DC subcarrier position is received.

In an embodiment, after receiving the BWP combination information, the terminal determines, for each BWP combination in the combination information, the DC subcarrier position of the terminal in a case that an activated BWP is a BWP in the BWP combination, and then the terminal may send to the base station the mapping relationship between each BWP combination in the combination information and the DC subcarrier position.

In an embodiment, the base station may receive the mapping relationship, for example, the base station may also save the mapping relationship, and subsequently, the base station may determine the DC subcarrier position corresponding to the BWP combination currently activated by the terminal based on the mapping relationship.

In an embodiment, the base station may not send the BWP combination information to the terminal in all cases, but may determine whether to send it according to specific conditions of the terminal. For example, the base station may receive a Power Amplifier (PA) capability reported by the terminal; and based on the PA capability, determine to send the combination information to the terminal, and determine the combination information.

In an embodiment, the base station may determine the number of PAs in the terminal according to the PA capability; and determine to send the combination information to the terminal, in response to the number of PAs being less than the number of Component Carriers (CCs) configured for the terminal.

It should be noted that, if the number of PAs is less than the number of CCs configured for the terminal, the PAs of the terminal include at least one target PA, and the target PA corresponds to a plurality of CCs.

In an embodiment, for each target PA, the base station may determine the BWP combination information for the target PA, and BWPs in each BWP combination in the BWP combination information correspond to different CCs in the target PA.

In an embodiment, if the number of PAs is not less than the number of CCs configured for the terminal, each PA of the terminal corresponds to at most one CC. Since the number of BWPs on each CC is limited, generally up to four BWPs, mapping relationships between all BWPs and DC subcarrier positions can be sent to the base station, and the amount of information occupied is not large.

In an embodiment, the base station may determine a first number of BWP combinations based on a load of the base station, the first number is negatively correlated with the load of the base station, and the number of BWP combinations in the combination information is the same as the first number.

In an embodiment, in response to the number of PAs being less than the number of CCs used by the terminal, it is determined that the PAs of the terminal include at least one target PA, and the target PA corresponds to a plurality of CCs. Each CC corresponds to at least one BWP, and BWPs in each BWP combination in the combination information correspond to different CCs.

In an embodiment, the number of BWP combinations in the combination information is less than the number of combinations that can be formed by all BWPs on the plurality of CCs corresponding to the target PA.

In an embodiment, BWPs in a BWP combination are in one-to-one correspondence with the plurality of CCs corresponding to the target PA. The number of BWP combinations in the combination information is less than the number of combinations that can be formed by all BWPs on the plurality of CCs corresponding to the target PA.

When determining the BWP combination information, the base station may determine the BWP combination according to the BWPs on all CCs corresponding to the target PA.

In an embodiment, BWPs in the BWP combination correspond to a CC belonging to a highest frequency band and a CC belonging to a lowest frequency band among the plurality of CCs corresponding to the target PA. The number of BWP combinations in the combination information is less than the number of combinations that can be formed by all BWPs on the CC belonging to the highest frequency band and the CC belonging to the lowest frequency band among the plurality of CCs corresponding to the target PA.

When determining the BWP combination information, the base station may also determine the BWP combination according to the BWPs on some of the plurality of CCs corresponding to the target PA. In an example, the base station may determine the BWP combination according to BWPs on the CC belonging to the highest frequency band and the CC belonging to the lowest frequency band among the plurality of CCs corresponding to the target PA.

In an embodiment, the base station may receive channel status information and a buffer status report of each BWP on a CC corresponding to the target PA sent by the terminal, determine, based on the channel status information and the buffer status report, a channel status and a buffered data volume of each BWP on the CC corresponding to the target PA, and determine the combination information according to the channel status and the buffered data volume.

In an example, the base station can obtain the channel status information and the buffer status report from the terminal. In an example, the base station may also determine at least one of the channel status and the buffer status report of each BWP in the terminal by itself.

In an embodiment, the determining, by the base station, the combination information according to the channel status and the buffered data volume includes: determining a channel status threshold and a buffered data volume threshold based on the channel status and the buffered data volume of each BWP on the CC corresponding to the target PA. A channel status of each BWP in each BWP combination in the combination information is better than the channel status threshold, and a buffered data volume of each BWP in each BWP combination in the combination information is less than the buffered data volume threshold.

In an example, the base station may also determine only one of the channel status threshold and the buffered data volume threshold, and determine the combination information as the channel status of each BWP in each BWP combination being better than the channel status threshold, or the buffered data volume of each BWP in each BWP combination being less than the buffered data volume threshold.

In an embodiment, the determining, by the base station, the combination information according to the channel status and the buffered data volume includes:

for the CC corresponding to the target PA, determining, based on a channel status and a buffered data volume of each BWP on the CC, a priority of each BWP in respective BWPs on the CC, where the priority is positively correlated with the channel status, and the priority is negatively correlated with the buffered data volume; and determining, based on the priority of each BWP in the respective BWPs on the CC to which each BWP belongs, the combination information according to a priority order from high to low, where a combination priority of each BWP combination in the combination information is positively correlated with a priority of each BWP in the combination, and the combination priority of each BWP combination in the combination information is higher than a priority threshold.

In an example, the base station may determine the priority of each BWP on the CC to which the BWP belongs according to at least one of the channel status and the buffered data volume of each BWP. Then, the base station may determine the BWP combination information according to the priority of the BWP in the BWP combination. Generally speaking, the base station can add a BWP combination whose combination priority is higher than the threshold to the BWP combination information.

According to the above-mentioned embodiments, the base station can determine the BWP combination information according to the BWP status, so that each BWP combination in the BWP combination information has a higher probability of being activated than other BWP combinations, and then a probability that the base station needs to query its corresponding DC subcarrier position is also higher. For the BWP combination with a lower probability of being activated, the probability that the base station queries its corresponding DC subcarrier position is also lower. Therefore, the base station may not obtain the DC subcarrier position with a low query probability, which reduces the signaling overhead and the performance pressure without affecting the basic function. In addition, the base station needs to save fewer mapping relationships, which not only reduces the storage pressure, but also accelerates the speed of subsequently querying the DC subcarrier position according to the activated BWP combination.

In an embodiment, for each BWP combination in the combination information, the priority of the BWP combination is determined based on the priority of each BWP in the combination; and the priority of each BWP combination in the combination information is sent to the terminal, for the terminal to determine a sending order of DC subcarrier positions based on the priority.

In an example, the terminal may send the DC subcarrier positions according to the priority order of respective BWP combinations from high to low, for example, the terminal may send the identity of the BWP combination and the corresponding DC subcarrier position, or may also directly send the DC subcarrier position, etc.

In an example, when receiving the DC subcarrier position sent by the terminal, the base station may receive a part of the DC subcarrier positions according to an order, rather than receiving all DC subcarrier positions.

According to the above-mentioned embodiments, the base station may determine the number of BWP combinations that need to be received as needed, and since the reception is performed according to the priority from high to low, a DC subcarrier corresponding to a BWP combination with the higher combination priority may be received first, and possibilities of using these DC subcarriers are also higher. Therefore, the base station may reduce the data to be received and reduce the performance pressure.

In an embodiment, the receiving the DC subcarrier position corresponding to each BWP combination of the at least one BWP combination sent by the terminal includes:

determining, based on the load of the base station, a second number of BWP combinations that need to be received, where the second number is negatively correlated with the load of the base station; and receiving the second number of DC subcarrier positions.

For the related embodiments on the base station side, reference may be made to the foregoing embodiments on the terminal side, which are only briefly described here.

Corresponding to the foregoing embodiments of the method for receiving the bandwidth part combination, the present disclosure further provides embodiments of an apparatus for receiving a bandwidth part combination.

FIG. 9 is a schematic block diagram showing an apparatus for receiving a bandwidth part combination according to an embodiment of the present disclosure. The apparatus for receiving the bandwidth part combination shown in this embodiment may be applied to a terminal, and the terminal includes but is not limited to an electronic device such as a mobile phone, a tablet computer, a wearable device, a sensor, and an Internet of Things device. The terminal may serve as a user equipment to communicate with a base station, and the base station includes but is not limited to a 4G base station, a 5G base station, and a 6G base station. In an embodiment, the base station may be a base station to which the apparatus for sending the bandwidth part combination described in any subsequent embodiment is applicable.

As shown in FIG. 9, the apparatus for receiving the bandwidth part combination may include a combination receiving module 901, configured to receive a Bandwidth Part (BWP) combination information sent by a base station, the combination information includes at least one BWP combination, and is configured to indicate the terminal to determine a DC subcarrier position corresponding to the at least one BWP combination; and the number of BWP combinations in the combination information is less than the number of combinations that are capable of being formed by all BWPs configured by the base station for the terminal.

In an embodiment, the apparatus may further include:
a position sending module 902, configured to determine a DC subcarrier position corresponding to each BWP combination of the at least one BWP combination; and send to the base station a mapping relationship between each BWP combination and the DC subcarrier position.

In an embodiment, the apparatus may further include a capability sending module 903, configured to report a Power Amplifier (PA) capability of the terminal to the base station, and the PA capability is used for the base station to determine to send the combination information to the terminal and to determine the combination information.

In an embodiment, the terminal is provided with at least one PA, the at least one PA includes at least one target PA, a target PA corresponds to a plurality of Component Carriers (CCs), and each CC corresponds to at least one BWP, and BWPs in a BWP combination correspond to different CCs.

In an embodiment, the number of BWP combinations in the combination information is less than the number of combinations that are capable of being formed by all BWPs on the plurality of CCs corresponding to the target PA.

In an embodiment, the apparatus may further include a status reporting module 904, configured to determine channel status information and a buffer status report of each BWP on a CC corresponding to the target PA; and report the channel status information and the buffer status report to the base station, and the channel status information and the buffer status report are used for the base station to determine the combination information.

In an embodiment, BWPs in the BWP combination correspond to a CC belonging to a highest frequency band and a CC belonging to a lowest frequency band among the plurality of CCs corresponding to the target PA.

In an embodiment, the position sending module 902 is specifically configured to:

in response to a DC subcarrier position corresponding to a BWP combination being inconsistent with a default relative position, send to the base station description information of the DC subcarrier position corresponding to the BWP combination; or in response to the DC subcarrier position corresponding to the BWP combination being consistent with the default relative position, send preset information to the base station.

In an embodiment, the apparatus may further include an order determination module 905, configured to receive priority information of the at least one BWP combination sent by the base station; and determine a sending order of the DC subcarrier position according to the priority information; and the position sending module 902 is specifically configured to send to the base station the mapping relationship according to the sending order.

Corresponding to the foregoing embodiment of the method for sending the bandwidth part combination, the present disclosure further provides embodiments of an apparatus for sending a bandwidth part combination.

Figure 10:
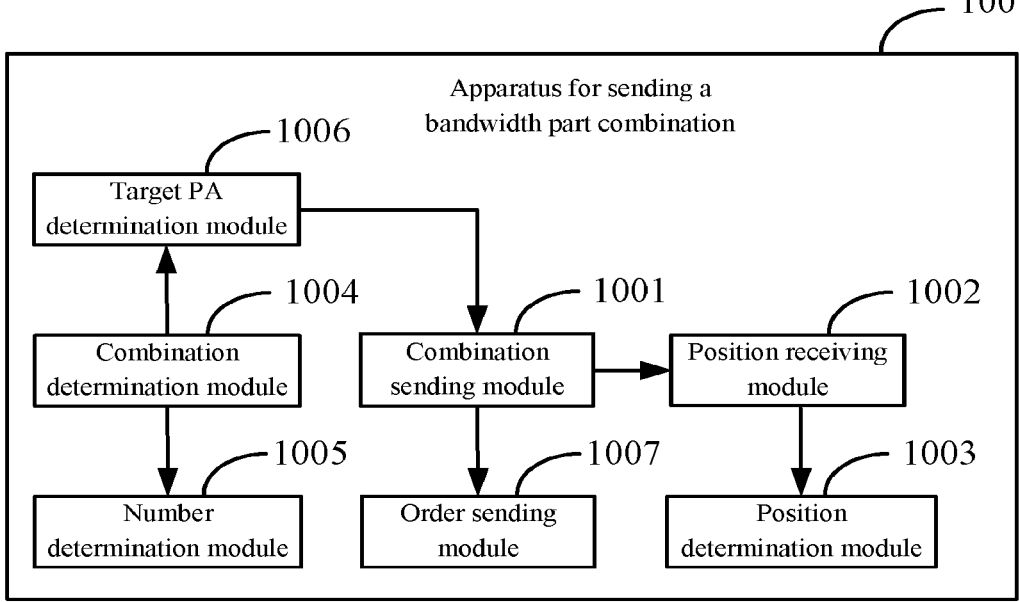
FIG. 10 is a schematic block diagram showing an apparatus for sending a bandwidth part combination according to an embodiment of the present disclosure.

FIG. 10 is a schematic block diagram showing an apparatus for sending a bandwidth part combination according to an embodiment of the present disclosure. The apparatus for sending the bandwidth part combination shown in this embodiment may be applied to a base station, and the base station includes but is not limited to a 4G base stations, a 5G base stations, and a 6G base station. The base station may communicate with a terminal serving as a user equipment, and the terminal includes but is not limited to an electronic device such as a mobile phone, a tablet computer, a wearable device, a sensor, and an Internet of Things device. In an embodiment, the terminal may be a terminal to which the apparatus for receiving the bandwidth part combination in any of the foregoing embodiments is applicable.

As shown in FIG. 10, the apparatus for sending the bandwidth part combination may include:

a combination sending module 1001, configured to send a Bandwidth Part (BWP) combination information to a terminal, the combination information includes at least one BWP combination, and is configured to indicate the terminal to determine a DC subcarrier position corresponding to the at least one BWP combination, and the number of BWP combinations in the combination information is less than the number of combinations that are capable of being formed by all BWPs configured by the base station for the terminal.

In an embodiment, the apparatus further includes:

a position receiving module 1002, configured to receive a mapping relationship between each BWP combination of the at least one BWP combination and a DC subcarrier position sent by the terminal.

In an embodiment, the apparatus further includes a position determination module 1003, configured to determine, based on the mapping relationship, a DC subcarrier position corresponding to a BWP combination currently activated by the terminal.

In an embodiment, the apparatus further includes a combination determination module 1004, configured to receive a Power Amplifier (PA) capability reported by the terminal; and based on the PA capability, determine to send the combination information to the terminal, and determine the combination information.

In an embodiment, the combination determination module 1004 is specifically configured to determine a number of PAs in the terminal according to the PA capability; and determine to send the combination information to the terminal, in response to the number of PAs being less than a number of Component Carriers (CCs) configured for the terminal.

In an embodiment, the apparatus further includes a number determination module 1005, configured to determine a first number of BWP combinations based on a load of the base station, the first number is negatively correlated with the load of the base station, and a number of BWP combinations in the combination information is the same as the first number.

In an embodiment, the apparatus further includes a target PA determination module 1006, configured to, in response to the number of PAs being less than a number of CCs used by the terminal, determine that the PAs of the terminal include at least one target PA, a target PA corresponds to a plurality of Component Carriers (CCs), each CC corresponds to at least one BWP, and BWPs in each BWP combination in the combination information correspond to different CCs.

In an embodiment, the number of BWP combinations in the combination information is less than the number of combinations that are capable of being formed by all BWPs on the plurality of CCs corresponding to the target PA.

In an embodiment, BWPs in a BWP combination are in one-to-one correspondence with the plurality of CCs corresponding to the target PA.

In an embodiment, BWPs in a BWP combination correspond to a CC belonging to a highest frequency band and a CC belonging to a lowest frequency band among the plurality of CCs corresponding to the target PA.

In an embodiment, the combination determination module 1004 is specifically configured to receive channel status information and a buffer status report of each BWP on a CC corresponding to the target PA sent by the terminal, determine, based on the channel status information and the buffer status report, a channel status and a buffered data volume of each BWP on the CC corresponding to the target PA, and determine the combination information according to the channel status and the buffered data volume In an embodiment, the combination determination module 1004 is specifically configured to determine a channel status threshold and a buffered data volume threshold based on the channel status and the buffered data volume of each BWP on the CC corresponding to the target PA, and a channel status of each BWP in each BWP combination in the combination information is better than the channel status threshold, and a buffered data volume of each BWP in each BWP combination in the combination information is less than the buffered data volume threshold.

In an embodiment, the combination determination module 1004 is specifically configured to, for the CC corresponding to the target PA, determine, based on a channel status and a buffered data volume of each BWP on the CC, a priority of each BWP in respective BWPs on the CC, and the priority is positively correlated with the channel status, and the priority is negatively correlated with the buffered data volume; and determine, based on the priority of each BWP in the respective BWPs on the CC to which each BWP belongs, the combination information according to a priority order from high to low, a combination priority of each BWP combination in the combination information is positively correlated with a priority of each BWP in the BWP combination, and the combination priority of each BWP combination in the combination information is higher than a priority threshold.

In an embodiment, the apparatus further includes an order sending module 1007, configured to, for each BWP combination in the combination information, determine a priority of the BWP combination based on a priority of each BWP in the BWP combination; and send to the terminal a priority of each BWP combination in the combination information for the terminal to determine, based on the priority, a sending order of DC subcarrier positions.

In an embodiment, the position receiving module 1002 is specifically configured to:

determine a second number of BWP combinations that need to be received based on a load of the base station, and the second number is negatively correlated with the load of the base station, and receive the second number of DC subcarrier positions.

Regarding the apparatus in the foregoing embodiments, a specific manner in which each module executes operations has been described in detail in embodiments related to the method, and will not be described in detail here.

For the apparatus embodiments, since they basically correspond to the method embodiments, the relevant parts can be referred to the description of the method embodiments. The apparatus embodiments described above are only illustrative. The units described as separated parts may or may not be physically separated, and the parts shown as units may or may not be physical units, that is, the units may be located in one place, or may be distributed over a plurality of network units. Some or all of the modules may be selected according to actual needs to achieve the objectives of the solutions of the present disclosure. Those of ordinary skill in the art can understand and implement the present disclosure without paying creative labor.

Embodiments of the present disclosure further provide an electronic device, including a processor and a memory configured to store processor-executable instructions. The processor is configured to implement the method for receiving the bandwidth part combination and/or the method for sending the bandwidth part combination as described above.

Embodiments of the present disclosure further provide a computer-readable storage medium having a computer program stored thereon, which, when executed by a processor, implements steps in the method for receiving the bandwidth part combination and/or the method for sending the bandwidth part combination as described above.

Figure 11:
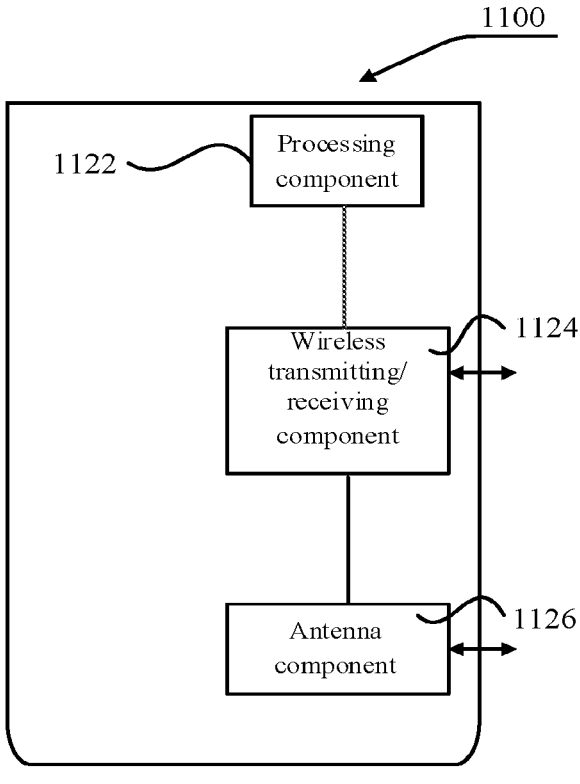
FIG. 11 is a schematic block diagram showing an apparatus for sending a bandwidth part combination according to an embodiment of the present disclosure.

As shown in FIG. 11, FIG. 11 is a schematic block diagram showing an apparatus 1100 for sending a bandwidth part combination according to an embodiment of the present disclosure. The apparatus 1100 may be provided as a base station. Referring to FIG. 11, the apparatus 1100 includes a processing component 1122, a wireless transmitting/receiving component 1124, an antenna component 1126, and a signal processing part specific to a wireless interface. The processing component 1122 may further include one or more processors. One of the processors in the processing component 1122 may be configured to perform the method for sending the bandwidth part combination.

Figure 12:
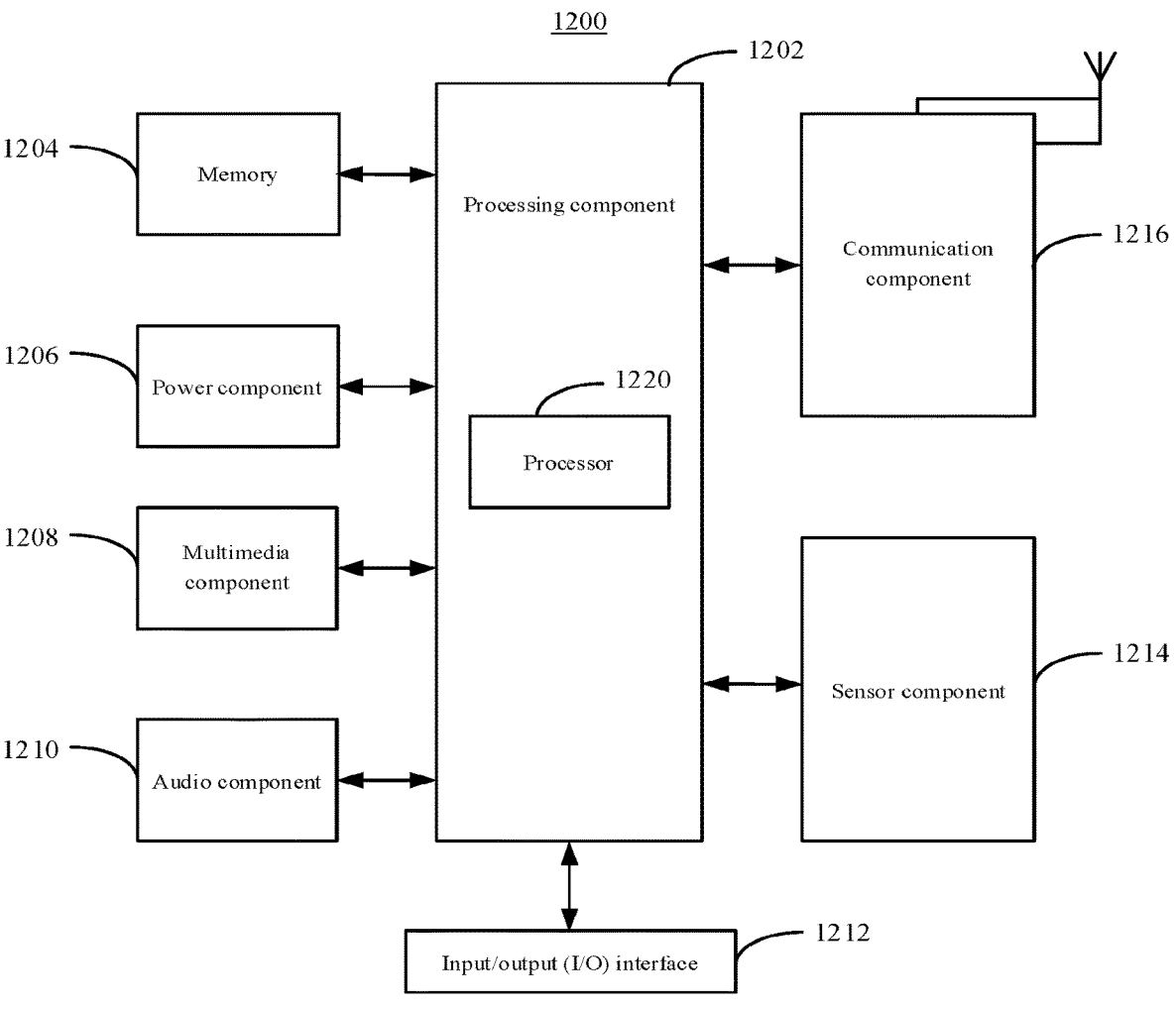
FIG. 12 is a schematic block diagram showing an apparatus for receiving a bandwidth part combination according to an embodiment of the present disclosure.

FIG. 12 is a schematic block diagram showing an apparatus 1200 for receiving a bandwidth part combination according to an embodiment of the present disclosure. For example, the apparatus 1200 may be a mobile phone, a computer, a digital broadcast terminal, a messaging device, a gaming console, a tablet device, a medical device, an exercise device, a personal digital assistant, and the like.

Referring to FIG. 12, the apparatus 1200 may include at least one of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include at least one processor 1220 to execute instructions to perform all or part of the steps in the method for receiving the bandwidth part combination as described above. Moreover, the processing component 1202 may include at least one module which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, at least one power source, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes at least one sensor to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may further include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on any communication standard, such as WiFi, 2G, 3G, 4G LTE, 5G NR or a combination thereof. In one example embodiment, the communication component 1216 receives a broadcast signal or broadcast associated information from an external broadcast management system via a broadcast channel. In one example embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments of the present disclosure, the apparatus 1200 may be implemented with at least one application specific integrated circuit (ASIC), digital signal processor (DSP), digital signal processing device (DSPD), programmable logic device (PLD), field programmable gate array (FPGA), controller, micro-controller, microprocessor, or other electronic components, for performing the method for receiving the bandwidth part combination described above.

In embodiments of the present disclosure, there is further provided a non-transitory computer readable storage medium including instructions, such as the memory 1204 including instructions, and the instructions are executable by the processor 1220 in the apparatus 1200 to perform the method for receiving the bandwidth part combination described above. For example, the non-transitory computer readable storage medium may be a ROM, a RAM, a CD-ROM, a magnetic tape, a floppy disc, an optical data storage device, and the like.

In the following, in combination with specific technical details, the method for sending the bandwidth part combination and the method for receiving the bandwidth part combination are generally exemplified as follows.

In the related arts, when uplink co-band carriers are aggregated, a method for separately reporting a single carrier cannot meet DC subcarrier reporting requirements when the number of PAs is less than the number of CCs, which will cause the base station to fail to determine the subcarrier position through the demodulation to perform the compensation, affecting an uplink demodulation performance. The method according to the present disclosure can not only solve the above problems, but also alleviate, by means of setting a priority by the base station, the problem of excessive signaling overhead caused by the DC subcarrier reporting.

When the terminal is configured for uplink multi-carrier carrier aggregation, the base station determines whether there is a need to transmit the BWP combination priority to the terminal according to the PA capability (such as 1 PA or 2 PAs) reported by the terminal, and the terminal feeds back, according to the priority, the DC subcarrier position of each BWP combination to the base station.

When the terminal is configured for uplink multi-carrier carrier aggregation, the base station determines whether there is a need to transmit the BWP combination priority to the terminal according to the PA capability (such as 1 PA or 2 PAs) reported by the terminal, and the terminal feeds back, according to the received priority information, the DC subcarrier position of each BWP combination to the base station.

The base station determines the PA capability according to the PA capability reported by the terminal. In an embodiment, the base station may determine the PA capability according to the dualPA-Architecture reported by the terminal in an existing protocol.

The base station determines whether it is necessary to transmit the BWP combination priority to the terminal according to the PA capability (such as 1 PA or 2 PAs) reported by the terminal. In an embodiment, the base station determines whether it is necessary to transmit the BWP combination priority to the terminal by determining whether the number of PAs is equal to the number of CCs during the co-band carrier aggregation. If it is determined that the number of PAs is equal to the number of CCs, it is not necessary to transmit the BWP combination priority to the terminal, and otherwise, it is necessary to transmit the BWP combination priority to the terminal.

The BWP combination priority refers to a preferred BWP combination on the configured CC. In an embodiment, combinations in a priority order of from high to low are: BWP11-BWP22-BWP31, BWP11-BWP21-BWP34, BWP14-BWP21-BWP-34, . . . . The determination of the priority and the number of combinations are determined according to the buffered data, the channel status reported by the terminal and a condition of loads scheduled by the base station.

The terminal feeds back the DC subcarrier position to the base station according to the received priority information, and the terminal feeds back the DC subcarrier position of each BWP combination according to the above priority combinations: BWP11-BWP22, BWP11-BWP21, BWP14-BWP21, . . . . In an embodiment, if the DC subcarrier follows a preset rule, for example, in an embodiment, the DC subcarrier is on a central subcarrier of the BWP combination, the DC subcarrier position information of this combination may not be reported, but only the DC subcarrier of the BWP combination that does not meet the preset rule is reported.

The DC subcarrier is located on the central subcarrier of the BWP combination, which refers to taking a center position of the two outermost BWP edges in a frequency domain.

After receiving the DC subcarrier position, the base station determines the DC subcarrier position of the terminal according to the activated BWP combination, and performs certain processing during demodulation to ensure the demodulation performance.

In another embodiment, when the base station notifies the terminal of the BWP combination priority, the BWP combination does not include BWP indications on all CCs, but only needs to include the BWP combination indications on the two outermost CCs. For example, the priority order from high to low is BWP12-BWP33, BWP14-BWP34, . . . . The determination of the priority and the number of combinations are determined according to the buffered data, the channel status reported by the terminal and a condition of loads scheduled by the base station.

When the terminal is configured for uplink multi-carrier carrier aggregation, the base station determines whether there is a need to transmit the BWP combination priority to the terminal according to the PA capability (such as 1 PA or 2 PAs) reported by the terminal, and the terminal feeds back, according to the received priority information, the DC subcarrier position of each BWP combination to the base station.

The base station may determine the number of PAs based on the PA capability reported by the terminal. In another embodiment, the base station can not only determine the number of PAs according to the dualPA-Architecture reported by the terminal in the existing protocol, but also determine the number of PAs according to the maximum bandwidth information supported by the two PAs reported by the terminal. For example, taking the terminal being configured with three CCs as an example, the maximum channel bandwidth supported by PA1 can cover two CCs, such as CC1 and CC2, while the maximum channel bandwidth supported by PA2 can only cover one CC, such as CC3.

In this case, the number of CCs is 3, and the number of PAs is 2. Therefore, the base station determines that there is a need to transmit the BWP combination priority to the terminal according to the PA capability reported by the terminal.

In addition, according to the bandwidth information of the PA, it is determined that the BWP combination priority needs to be transmitted to the terminal on the two CCs on the PA1, without considering CC3. That is, the reported priority combination only includes CC1 and CC2, such as: BWP11-BWP22, BWP11-BWP21, BWP14-BWP21, . . . . The determination of the priority and the number of combinations are determined according to the buffered data, the channel status reported by the terminal and a condition of loads scheduled by the base station.

In an embodiment, the above method is not only applicable to the multi-uplink CA, but also applicable to a dual-connectivity (i.e., DC) system.

Other implementations of embodiments of the present disclosure will be apparent to those skilled in the art from consideration of the specification and practice of the present disclosure disclosed herein. The present disclosure is intended to cover any variations, uses, or adaptations embodiments of the present disclosure, which are in accordance with the general principles of embodiments of the present disclosure and include common general knowledge or conventional technical means in the art that are not disclosed in the present disclosure. The specification and embodiments are illustrative, and the real scope and spirit of embodiments of the present disclosure is defined by the appended claims.

It should be understood that embodiments of the present disclosure are not limited to the precise structures that have been described above and shown in the drawings, and various modifications and changes can be made without departing from the scope thereof. The scope of embodiments of the present disclosure is limited only by the appended claims.

It should be noted that, relational terms such as "first" and "second" in the disclosure are used only to distinguish an entity or operation from another entity or operation, and do not necessarily require or imply any actual relationship or sequence existed between these entities or operations. The terms "comprises", "includes" or any other variation thereof are intended to encompass non-exclusive inclusion such that a process, a method, an article or a device comprising a list of elements includes not only those elements, but also other elements not expressly listed, or also includes elements inherent to such process, method, article or device. Without more limitations, an element qualified by the sentence "comprising a . . . " does not preclude a presence of additional identical elements in the process, method, article or device that includes the element.

The methods and apparatuses provided by embodiments of the present disclosure have been described in detail above, and specific examples are used herein to illustrate the principles and implementations of the present disclosure. The above description of embodiments is only used to help understand methods and their core ideas of the present disclosure. In addition, for those skilled in the art, according to the concept of the present disclosure, there may be changes in the specific implementation and application scope. In summary, the contents of this specification should not be construed as limiting the present disclosure.

What is claimed is:

1. A method for receiving a bandwidth part combination, performed by a terminal, and comprising:

receiving a Bandwidth Part (BWP) combination information sent by a base station, wherein the BWP combination information comprises at least one BWP combination, and is configured to indicate the terminal to determine a Direct Current (DC) subcarrier position corresponding to the at least one BWP combination; and wherein a number of BWP combinations in the BWP combination information is less than a number of BWP combinations that are capable of being formed by all BWPs configured by the base station for the terminal, the number of BWP combinations in the BWP combination information is the same as a first number, and the first number is negatively correlated with a load of the base station.

2. The method according to claim 1, further comprising:

determining a DC subcarrier position corresponding to each BWP combination of the at least one BWP combination; and sending to the base station a mapping relationship between each BWP combination and the DC subcarrier position.

3. The method according to claim 1, further comprising:

reporting a Power Amplifier (PA) capability of the terminal to the base station, wherein the PA capability is used for the base station to determine to send the BWP combination information to the terminal and to determine the BWP combination information.

4. The method according to claim 1, wherein the terminal is provided with at least one PA, the at least one PA comprises at least one target PA, a target PA corresponds to a plurality of Component Carriers (CCs), and each CC corresponds to at least one BWP, and BWPs in a BWP combination correspond to different CCs; and wherein the number of BWP combinations in the BWP combination information is less than a number of BWP combinations that are capable of being formed by all BWPs on the plurality of CCs corresponding to the target PA.

5. The method according to claim 4, further comprising:

determining channel status information and a buffer status report of each BWP on a CC corresponding to the target PA; and reporting the channel status information and the buffer status report to the base station, wherein the channel status information and the buffer status report are used for the base station to determine the BWP combination information.

6. The method according to claim 4, wherein BWPs in the BWP combination are in one-to-one correspondence with the plurality of CCs corresponding to the target PA; or wherein BWPs in the BWP combination correspond to a CC belonging to a highest frequency band and a CC belonging to a lowest frequency band among the plurality of CCs corresponding to the target PA.

7. The method according to claim 2, wherein the sending to the base station the mapping relationship between each BWP combination and the DC subcarrier position comprises:

in response to a DC subcarrier position corresponding to a BWP combination being inconsistent with a default relative position, sending to the base station description information of the DC subcarrier position corresponding to the BWP combination; or in response to the DC subcarrier position corresponding to the BWP combination being consistent with the default relative position, sending preset information to the base station.

8. The method according to claim 2, further comprising:

receiving priority information of the at least one BWP combination sent by the base station; and determining a sending order of the DC subcarrier position according to the priority information;

wherein the sending to the base station the mapping relationship between each BWP combination and the DC subcarrier position comprises:

sending to the base station the mapping relationship according to the sending order.

9. A method for sending a bandwidth part combination, performed by a base station, and comprising:

determining a first number of Bandwidth Part (BWP) combinations based on a load of the base station, wherein the first number is negatively correlated with the load of the base station; and sending BWP combination information to a terminal, wherein the BWP combination information comprises at least one BWP combination, and is configured to indicate the terminal to determine a Direct Current (DC) subcarrier position corresponding to the at least one BWP combination, and a number of BWP combinations in the BWP combination information is the same as the first number;

wherein the number of BWP combinations in the BWP combination information is less than a number of BWP combinations that are capable of being formed by all BWPs configured by the base station for the terminal.

10. The method according to claim 9, further comprising:

receiving a mapping relationship between each BWP combination of the at least one BWP combination and a DC subcarrier position sent by the terminal.

11. The method according to claim 10, further comprising:

determining, based on the mapping relationship, a DC subcarrier position corresponding to a BWP combination currently activated by the terminal.

12. The method according to claim 9, further comprising:

receiving a Power Amplifier (PA) capability reported by the terminal; and based on the PA capability, determining to send the BWP combination information to the terminal, and determining the BWP combination information; and wherein the based on the PA capability, determining to send the BWP combination information to the terminal comprises:

determining a number of PAs in the terminal according to the PA capability; and determining to send the BWP combination information to the terminal, in response to the number of PAs being less than a number of Component Carriers (CCs) configured for the terminal.

13. The method according to claim 12, further comprising:

in response to the number of PAs being less than a number of CCs used by the terminal, determining that the PAs of the terminal comprise at least one target PA, wherein a target PA corresponds to a plurality of Component Carriers (CCs);

wherein each CC corresponds to at least one BWP, and BWPs in each BWP combination in the BWP combination information correspond to different CCs.

14. The method according to claim 13, wherein the number of BWP combinations in the BWP combination information is less than a number of BWP combinations that are capable of being formed by all BWPs on the plurality of CCs corresponding to the target PA.

15. The method according to claim 13, wherein BWPs in a BWP combination are in one-to-one correspondence with the plurality of CCs corresponding to the target PA; or wherein BWPs in a BWP combination correspond to a CC belonging to a highest frequency band and a CC belonging to a lowest frequency band among the plurality of CCs corresponding to the target PA.

16. The method according to claim 13, further comprising:

receiving channel status information and a buffer status report of each BWP on a CC corresponding to the target PA sent by the terminal;

determining, based on the channel status information and the buffer status report, a channel status and a buffered data volume of each BWP on the CC corresponding to the target PA; and determining the BWP combination information according to the channel status and the buffered data volume.

17. The method according to claim 16, wherein the determining the BWP combination information according to the channel status and the buffered data volume comprises:

determining a channel status threshold and a buffered data volume threshold based on the channel status and the buffered data volume of each BWP on the CC corresponding to the target PA;

wherein a channel status of each BWP in each BWP combination in the combination information is better than the channel status threshold, and a buffered data volume of each BWP in each BWP combination in the combination information is less than the buffered data volume threshold.

18. The method according to claim 16, wherein the determining the BWP combination information according to the channel status and the buffered data volume comprises:

for the CC corresponding to the target PA, determining, based on a channel status and a buffered data volume of each BWP on the CC, a priority of each BWP in respective BWPs on the CC, wherein the priority is positively correlated with the channel status, and the priority is negatively correlated with the buffered data volume; and determining, based on the priority of each BWP in the respective BWPs on the CC to which each BWP belongs, the BWP combination information according to a priority order from high to low, wherein a combination priority of each BWP combination in the BWP combination information is positively correlated with a priority of each BWP in the BWP combination, and the combination priority of each BWP combination in the BWP combination information is higher than a priority threshold.

19. The method according to claim 16, further comprising:

for each BWP combination in the BWP combination information, determining a priority of the BWP combination based on a priority of each BWP in the BWP combination; and sending to the terminal a priority of each BWP combination in the BWP combination information for the terminal to determine, based on the priority, a sending order of DC subcarrier positions.

\* \* \* \* \*